May 22, 1962 W. R. FRIEDL 3,035,650
SCALE ATTACHMENT FOR HYDRAULIC LIFTS
Filed Oct. 31, 1957 2 Sheets-Sheet 1
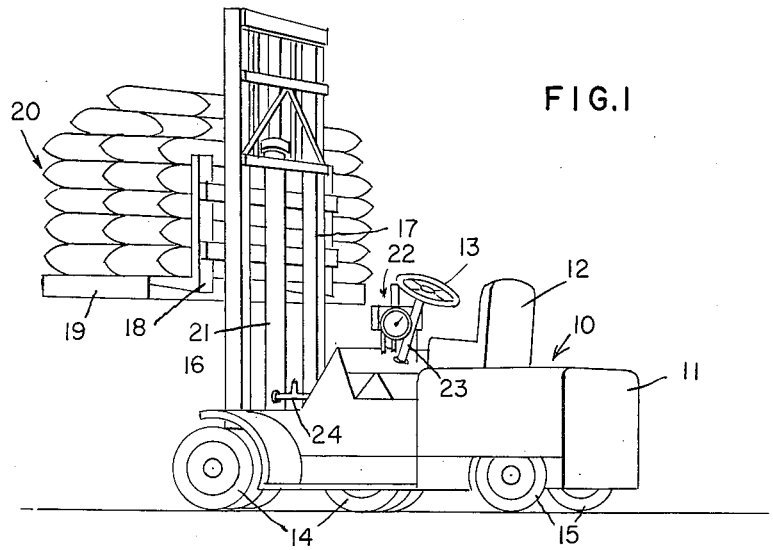
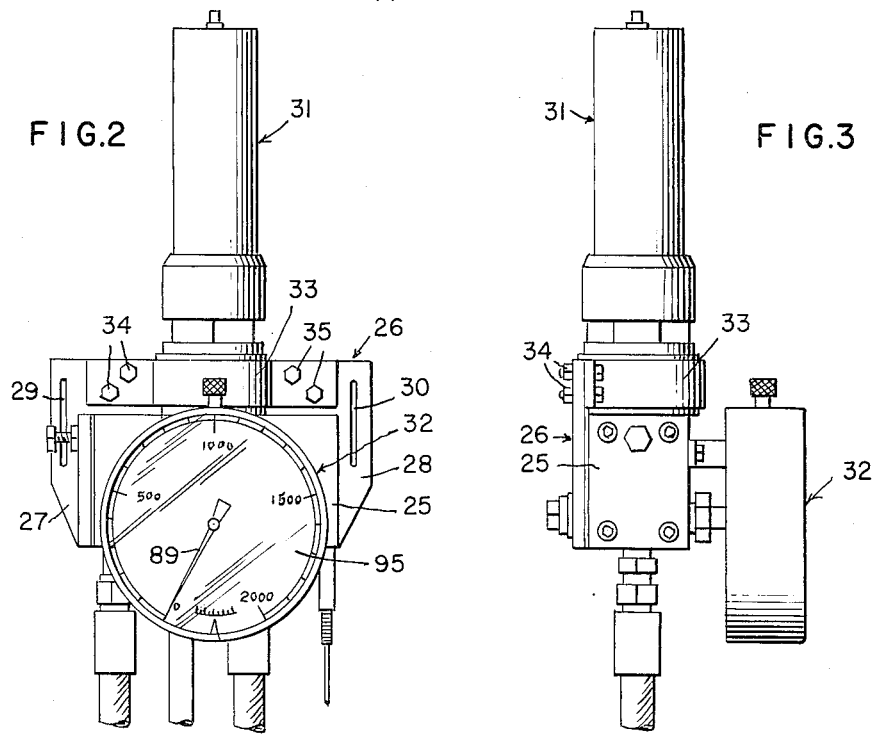
INVENTOR
Wolfgang R. Friedl
BY Shoemaker & Mattare
ATTORNEYS May 22, 1962 W. R. FRIEDL 3,035,650
SCALE ATTACHMENT FOR HYDRAULIC LIFTS
Filed Oct. 31, 1957 2 Sheets-Sheet 2
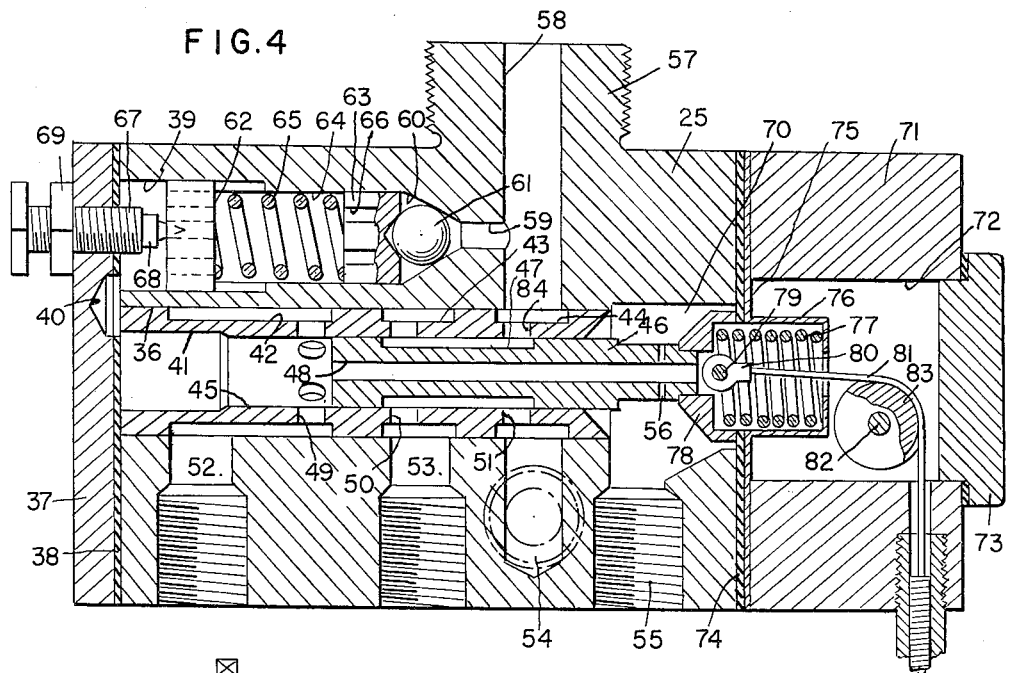
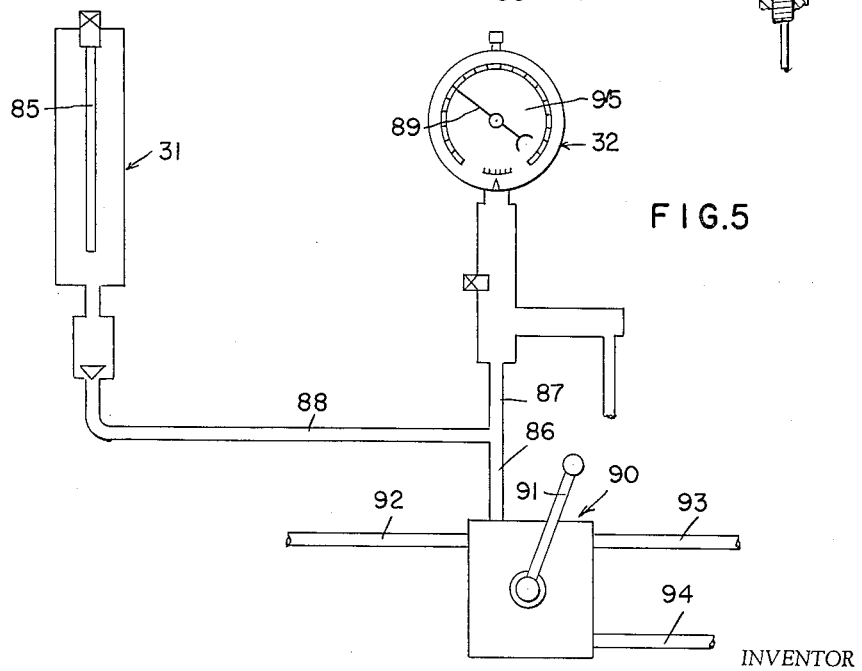
INVENTOR
Wolfgang R. Friedl
BY Shoemaker & Mattare
ATTORNEYS United States Patent Office 3,035,650
Patented May 22, 1962

3,035,650
SCALE ATTACHMENT FOR HYDRAULIC LIFTS
Wolfgang R. Friedl, Rheinstrasse 52, Mainz-Gonsenheim, Germany, assignor of one-fourth to Dallas Lee Batten, Bethesda, Md.
Filed Oct. 31, 1957, Ser. No. 693,703
2 Claims. (Cl. 177—208)

This invention relates generally to a weighing attachment and pertains more particularly to a scale device adapted to be attached to a hydraulic lift mechanism whereby the weight of an object on the lift may be determined accurately and quickly.

It is generally old in the art to provide means for ascertaining the weight of an object or objects placed upon the lift of a hoisting or lift mechanism but from a practical aspect, the type wherein the scale or weighing device is made as an attachment for the lifting device, is not too accurate and it is common to dispense with such mechanisms and employ a separate platform scale or the like upon which the lifting mechanism is moved or driven and with the unladen weight of the lifting mechanism being known, the weight of the object carried thereby may be determined with varying degrees of accuracy depending upon the accuracy of the scale so used. The primary reason why atachment type scale mechanisms have not been practical is that the lifting mechanism of the lifting device usually is characterized by a substantial amount of internal friction in the portion thereof which is to move the load vertically and because of this, since the conventional type of atachment scale mechanism attempts to detect the weight while the lift is in a stationary position, the resultant accuracy is none too good. Naturally, the aforementioned internal friction varies in accordance with the absolute weight of the object on the lift and in most cases would not be a linear function of this weight so that it is difficult, if not impossible, to properly calibrate a scale which may be used to accurately determine the weight of an object with conventional atachment scale constructions.

It is, therefore, a primary object of this invention to provide an improved scale attachment for hydraulic lift devices which eliminates as much as is practically possible the inherent inaccuracy due to internal friction of the lift device and mechanism.

Still another object of this invention is to provide a scale attachment for lift devices and, more particularly, for hydraulic forklifts and the like in which the scale or weighing mechanism detects a fluid pressure proportional to the weight of the object on the forklift while the same is moving vertically downwardly, rather than in a static position as is conventional, thus eliminating grave inaccuracy which might otherwise occur due to the static friction in the lifting device.

Another object of this invention is to provide an improved scale attachment for hydraulic forklifts and the like in which the weighing of the object on the forklift is detected during movement of the fork under its own weight plus the weight of the object disposed thereon so that errors introduced will be primarily due to sliding friction rather than static friction and hence of negligible or easily calibrated magnitude.

With the above and other objects in view, the invention consists in the construction and novel combination and arrangement of parts hereinafter fully described, illustrated in the accompanying drawings and pointed out in the claims hereto appended, it being understood that various changes in the form, proportions, and minor details of construction, within the scope of the claims, may be resorted to without departing from the spirit or sacrificing any of the advantages of the invention.

In the drawings:
FIG. 1 is a perspective view of a conventional type of lift fork truck illustrating the invention operatively mounted thereon;
FIG. 2 is a front elevational view of the scale attachment illustrating the relative position of the component parts and depicting the scale or gauge element;
FIG. 3 is a side elevational view of the assembly shown in FIG. 2;
FIG. 4 is an enlarged cross sectional view taken through the valve body and illustrating the principles of operation thereof; and
FIG. 5 is a diagrammatic view illustrating the relative operational connections between the various component parts of the attachment mechanism.

Referring at this time more particularly to FIG. 1, the reference numeral 10 indicates in general a conventional type forklift truck having the usual body 11 and an operator's station 12 and a steering wheel 13 associated therewith, the forklift truck having driving wheels 14 and dirigible wheels 15. At the front of the forklift truck are a pair of vertical rail elements 16 and 17 and guidably supported on these rails is a fork device 18 which, in FIG. 1, is shown positioned with its tines supporting a pallet 19 upon which the load 20 rests. Rising between the two rail members 16 and 17 is a hydraulic cylinder 21 which operates to raise and lower the fork assembly 18 so as to raise and lower the load 20 as desired.

In FIG. 1, the scale attachment assembly indicated generally by the reference character 22 is shown as being mounted on or adjacent to the steering wheel post 23 and which is so constructed as to operate to detect pressures in the hydraulic cylinder 21 and for this purpose is connected thereto through a conduit or pipe 24 as shown in FIG. 1.

FIGS. 2 and 3 serve to illustrate the physical form of the invention which consists essentially of a main body portion 25 to which is attached a mounting bracket 26 which may be provided with laterally projecting ears 27 and 28 on opposite sides thereof and which ears are provided with elongate slots 29 and 30 so as to receive fastening elements for securing the attachment to an associated device, such as the lift truck shown in FIG. 1.

The main body portion 25, therefore, constitutes the base or main support portion of the assembly and upon which is mounted the hydraulic pneumatic cylinder 31, hereinafter described in more detail, and the gauge indicated generally by the reference character 32. The accumulator 31 is threaded into the upper portion of the main body 25 but to secure a sturdier mounting therefor, the strap element 33 is associated therewith, which strap is secured as by fasteners 34 and 35 to the aforementioned bracket 26.

In FIG. 4, the main body portion 25 is illustrated on an enlarged scale to show the details of its internal construction and in this figure, it is to be noted that the body is provided with a transversely extending bore 36 which is closed at one side by the end plate element 37 and associated gasket 38, the end plate also covering a secondary recess 39 and being provided with a transfer depression 40 which intercommunicates the recess 39 and the bore 36, as will be readily apparent. The bore 36 is provided with a gated liner 41 which has a series of external grooves 42, 43 and 44 formed circumferentially in its outer surface and the liner is of generally cylindrical configuration and has a uniform bore portion 45 within which is snugly but slidably received the valve element 46.

The valve 46 is of cylindrical configuration and is provided with a circumferentially extending groove 47 of predetermined length as will be presently apparent and is also provided with a longitudinally extending bore 48 which is continuous from one end to the other thereof.

The liner 41 is provided with a series of openings communicating the interior thereof with the various grooves 42, 43 and 44 and these openings are designated respectively by the reference characters 49, 50 and 51 and it is with these openings that the groove 47 on the valve 46 is adapted to cooperate to selectively cover or uncover certain of such openings to transfer the fluid flow between the various ports 52, 53, 54 and 55, the bore 48 in the valve 46 serving, at times, to communicate the port 55 with the groove 42 in the liner through the openings 49, for a purpose which will be presently apparent and for this reason, the outer end of the valve 46 is provided with a transverse bore 56 intersecting the bore 48 therein and serving to dump fluid to the port 55.

On the upper side of the valve body 25 is provided a threaded boss 57 upon which the lower end of the hydraulic pneumatic cylinder 31 is threadingly engaged and this boss is provided with a conduit 58 extending downwardly in the main body as shown and which conduit communicates with the hydraulic pneumatic cylinder. Within the conduit 58 is an orifice 59 which leads into the aforementioned recess 39 and the end of the recess 39 adjacent the conduit 58 is provided with a conical seat 60 within which the ball member 61 is engaged to normally close off the communication between the conduit 58 and recess 39. A piston 62 is slidably received within the recess 39 and a second piston 63 is slidably received in the reduced portion 64 of the recess and a compression spring 65 interposed between these two pistons, the latter piston engaging against the ball 61 and normally urging the same into engagement with the tapered seat 60. Both pistons 62 and 63 are provided with openings such as those indicated by the reference character 66 for the piston 63 so that fluid may flow through the orifice 59 and into the recess 39 beyond the piston 62 and dumped, through the transfer depression 40, into the interior of the liner 41. The end plate or cap 37 is provided with a threaded bore receiving the bolt element 67, the inner 68 of which bears against the piston 62 to vary, as desired, the initial pressure of the spring 65 and a lock nut 69 is associated with the bolt 67 to hold the desired adjusted position thereof.

The previously mentioned port 55 communicates into an enlarged chamber 70 of the main body 25 and which chamber opens upon the corresponding end thereof as is clearly illustrated in FIG. 4, this end being closed by the block element 71 having the opening 72 therethrough and closed at the outer side thereof by the block element 73, a gasket 74 being interposed between the block 71 and the corresponding end of the body 25.

Interposed between the main body 25 and the end block 71 is a plate element 75 having a cup 76 formed therein and projecting within the opening 72 in the end block 71. Within this cup is seated a compression spring 77 having its opposite end bearing against the head element 78 engaged on the corresponding end of the valve 46. The head 78 carries a transverse pin 79 which in turn carries the connector element 80 fastened to one end of the Bowden wire 81. The end block 71 carries a transverse pin 82 upon which is journalled a pulley element 83 over which the Bowden wire 81 is trained so as to extend outwardly through the end block 71 substantially at right angles to the longitudinal axis of the valve 46. The Bowden wire 81 is provided with a suitable handle element at its opposite end so that an operator, by pulling on the wire, may position the valve 46 as shown in FIG. 4, the normal position of this valve being such, under the influence of the compression spring 77, as to cover the openings 51 in the liner 41 and register the valve groove 47 with the openings 49 and 50 so as to intercommunicate the same.

In operation, the respective ports 52, 53, 54 and 55 are connected to the hydraulic pump of the associated lift fork or the like, the hydraulic cylinder of the lift fork, such as that indicated by the reference character 21 in FIG. 1, the gauge 32 and the reservoir for the hydraulic pump and which is carried by the lift fork or the associated mechanism to which the assembly is to be attached.

When the valve 46 is in the normal position, that is, in the position as dictated by the compression spring 77, with the ports 52 and 53 intercommunicated by the valve groove 47, the lift fork or similar device may operate in the usual manner and no pressure is transmitted to the weighing mechanism, or more specifically, to the gauge 32. However, when the valve 46 is in the position shown in FIG. 4, the hydraulic pump is disconnected from the hydraulic cylinder and the cylinder is connected directly to the gauge through the port 54 and to the hydraulic pneumatic cylinder 31 through the opening 84 in the liner 41 and the conduit 58. When the parts are in this position, and as held there by the operator, the pressure within the hydraulic cylinder 21 is transmitted to the gauge 32 and simultaneously to the hydraulic pneumatic cylinder 31. As shown in FIG. 5, wherein the various components are diagrammatically illustrated, the hydraulic pneumatic cylinder 31 is of a predetermined capacity and is very nearly completely filled at all times with hydraulic fluid except that the open tube 85 projecting into the cylinder is filled with air or some compressible fluid. Due to the presence of the compressible fluid in the hydraulic pneumatic cylinder 31, when the valve 46 is positioned such that the hydraulic cylinder 21 and the pressure therein is communicated to the gauge 32 and the hydraulic pneumatic cylinder 31, the compressible fluid will be compressed in direct proportion to the weight of the material on the lift fork and, of course, the weight of the lift fork itself. Therefore, the lift fork will drop, under its own weight and the weight of the load thereon slightly, and in actual practice the distance is about one or two inches, at which time the only restraining friction is due to sliding friction rather than static friction, the former being of substantially less magnitude than the static friction. Due to the inertia of the load and the lift fork, the maximum pressure developed within the system shown diagrammatically in FIG. 5 and embracing the conduits 86, 87 and 88 will be slightly greater than the pressure in the system at static position so that after the lift fork and load have dropped the aforementioned one or two inches, they will be again raised a slight amount which, in actual practice, is a barely perceptible amount and then the pressure in the system will be very close to an accurate indication of the total weight of the lift fork and the load thereon.

The gauge 32 embodies a bleed passageway therein into the Bourdon tube which actuates the needle 89 thereof so that by the time that the load has dropped and then been raised, the needle 89 will have attained, and only then attained, its maximum reading position, thereby completely eliminating an introduction of error into the scale reading which might otherwise occur as a result of static friction. In other words, in effect, the scale reading is taken at an effective pressure produced when the load and lift fork are moving downwardly so as to obviate or eliminate any inaccuracies due to any static friction component and to introduce into the system only an error which is proportional to the sliding friction which is, of course, substantially constant regardless of the load and which in any case is substantially less than the static friction. To minimize the effect of inertia, it is preferable to provide a reduced orifice somewhere into the system leading into the hydraulic pneumatic cylinder 31 so that the fluid is bled rather slowly thereinto without a sudden drop of the lift fork and load thereon.

By way of further explanation of the manner in which the operation of the mechanism occurs, it will be appreciated that a load reading taken of the fork lift and the material thereon in a static position will be lower than the actual reading but that the reading taken in accordance with this invention, that is by removing the static friction and permitting the load to be moving will produce a higher reading more nearly approximating the true weight. Therefore, it can also be appreciated that if the bleed passageway to the gauge is of proper restriction, the internal pressure within the gauge will lag somewhat behind the pressure in the system and will, furthermore, under the conditions outlined above, never reach the maximum pressure in the system but will reach a pressure between the static pressure reading and the maximum pressure reading and by properly restricting the bleed passageway, the indicated reading can be made to very closely approximate the actual load conditions on the lift fork.

In FIG. 5, the valve assembly is indicated generally by the reference character 90 and the reference character 91 indicates diagrammatically a handle which is used to actuate the valve, the various conduits 92, 93 and 94 indicating respectively the dump back to the reservoir, the connection to the hydraulic cylinder and the connection to the hydraulic pump.

The purpose of the relief valve 61 is, of course, to prevent overloading of the gauge 32 and is intended only to bypass pressure surges, should they occur, back to the reservoir of the hydraulic pump system.

With the specific construction as described above, it will be evident that not only does the system measure a fluid pressure at such time as the sliding friction is the only error component and hence is easily calibrated, but also that the gauge 32 is at all times disconnected from the regular lift fork hydraulic system in that it is either completely disconnected therefrom or is only connected to the hydraulic cylinder of that system. This latter consideration prevents undue wear and tear upon the gauge since, of course, with operation of vehicles, such as those shown in FIG. 1, pressure surges in the system are very common as, for example, when passing over rough surfaces and the like.

The face or scale 95 of the gauge 32 is calibrated directly in pounds or the like and may be easily calibrated to accommodate for any errors which might be introduced as a result of sliding friction, which in any case is substantially negligible anyhow.

In summary, the operation of the invention as disclosed schematically or diagrammatically in FIG. 5 is hereinafter described. During conventional operation of the lifting mechanism, the hydraulic lift cylinder 21 communicates with a fluid pressure pump through conduits 93 and 94. At this time, the valve means 90 is disposed in a position so that the hydraulic pneumatic cylinder 31 and the pressure gauge 32 are closed off from communication with the hydraulic lift cylinder 21 and the pump means. When it is desired to register the weight of a load 20 on the lift platform 19 of the lifting mechanism, the valve means 90 is actuated to communicate hydraulic pneumatic cylinder 31 and scale means 32 with the hydraulic lift cylinder 21 through conduits 88 and 93, and to disconnect or close off communication between the hydraulic cylinder 21 and the fluid supply means from the pump through conduit 94. Thus, the fluid under pressure from the hydraulic cylinder 21 will be transmitted or flow into the hydraulic pneumatic cylinder 31 and the gauge 32 and thus register the weight of the load in direct proportion to the pressure of the fluid. At this time, the fork lift will move vertically downwardly as the fluid flows from the hydraulic lift cylinder 21 into the hydraulic pneumatic cylinder 31 and thus any weight factor due to static friction will be eliminated to give a more accurate reading of the actual load on the fork lift platform. The downward movement of the fork lift occurs because the volume or space confining the fluid is increased by connecting the hydraulic pneumatic cylinder, with its air space therein, to the hydraulic cylinder.

In summation, the operation of the invention in connection with the more detailed structure shown in FIG. 4 is as follows. The hydraulic cylinder 21 and hydraulic cylinder port 53 is in direct communication with the hydraulic pneumatic cylinder 31 and hydraulic pneumatic port 58 and the gauge 32 and gauge port 54 through valve recess 47. At this time, it can be clearly seen that the hydraulic pump is disconnected from the hydraulic cylinder because the hydraulic pump port 52 does not communicate with the recess 47 of valve 46.

When it is desired to register the load on the platform 19 of the fork lift, the valve 46 is actuated to move to the left end of the valve body. In this position the valve 46 communicates the hydraulic cylinder port 53 directly with the hydraulic pump port 52 through recess 47 in the valve, and closes off communication of the hydraulic cylinder port 53 with the gauge port 54 and hydraulic pneumatic cylinder port 58.

It will also be apparent that when the hydraulic cylinder port 53 communicates with the gauge port 54 and the hydraulic pneumatic cylinder port 58, the fluid under pressure from the hydraulic lift cylinder 21 will flow into these ports, and the load and the fork lift 19 will be moving vertically downwardly so that the weight registered by the scale will be registered under inertia conditions, thereby eliminating any static frictional forces and giving a more accurate reading of the load.

I claim:

1. A weighing attachment for a hydraulic lifting mechanism comprising a hydraulic lifting cylinder for actuating said lifting mechanism, means for supplying hydraulic fluid under pressure to said hydraulic lifting cylinder, a hydraulic pneumatic cylinder in communication with said hydraulic lifting cylinder for receiving said hydraulic fluid under pressure from said hydrulic lifting cylinder, scale means in communication with said hydraulic pneumatic cylinder for registering the fluid pressure therein, and valve means disposed between said cylinders and hydraulic fluid supply means for closing off communication with said fluid pressure supply means and communicating said cylinders with one another at one time, and for communicating said fluid pressure supply means with said hydraulic lifting cylinder at another time.

2. The weighing attachment of claim 1 wherein said valve means comprises a hollow body and end plates closing off the opposite ends thereof, a ported cylindrical liner received within a hollow portion of said valve body having a hydraulic cylinder port, a hydraulic pneumatic cylinder port, and a hydraulic fluid supply means port, a piston slidably received in said liner to selectively close off said fluid supply port and communicate said cylinder ports with each other at one time, and to close off said hydraulic pneumatic port and communicate said hydraulic cylinder port and said hydraulic fluid supply means port with each other at another time.

References Cited in the file of this patent

UNITED STATES PATENTS

| 1,996,060 | Bijur | Apr. 2, 1935 |
| 2,848,212 | Kerridge | Aug. 19, 1958 |

FOREIGN PATENTS

| 753,822 | Great Britain | Aug. 1, 1956 |